(12) United States Patent
Mueller et al.

(10) Patent No.: US 12,263,654 B2
(45) Date of Patent: Apr. 1, 2025

(54) SYSTEMS AND METHODS FOR SECURING A PANEL INSERT TO A PANEL

(71) Applicant: THE BOEING COMPANY, Chicago, IL (US)

(72) Inventors: Andrew William Mueller, Mukilteo, WA (US); Terrence C. Seet, Everett, WA (US); John C. Osborne, Madison, AL (US)

(73) Assignee: The Boeing Company, Chicago, IL (US)

( * ) Notice: Subject to any disclaimer, the term of this patent is extended or adjusted under 35 U.S.C. 154(b) by 237 days.

(21) Appl. No.: 17/900,967

(22) Filed: Sep. 1, 2022

(65) Prior Publication Data

US 2024/0075692 A1 Mar. 7, 2024

(51) Int. Cl.
| | |
|---|---|
| *B29C 65/00* | (2006.01) |
| *B29C 65/48* | (2006.01) |
| *B29C 65/56* | (2006.01) |
| *B29L 7/00* | (2006.01) |
| *B32B 37/14* | (2006.01) |
| *F16B 5/02* | (2006.01) |
| *F16B 9/02* | (2006.01) |
| *F16B 11/00* | (2006.01) |
| *F16B 37/04* | (2006.01) |

(52) U.S. Cl.
CPC .......... *B29C 66/474* (2013.01); *B29C 65/562* (2013.01); *F16B 9/02* (2013.01); *B29C 65/4835* (2013.01); *B29C 66/82* (2013.01); *B29L 2007/002* (2013.01); *B32B 37/142* (2013.01); *F16B 5/0208* (2013.01); *F16B 11/006* (2013.01); *F16B 37/04* (2013.01)

(58) Field of Classification Search
CPC .......... F16B 5/01; F16B 5/0208; F16B 37/04; F16B 37/048; F16B 11/006; F16B 13/14; F16B 13/141; F16B 19/1063; B29C 66/82; B29C 65/4835; B29C 65/562; B32B 37/142
See application file for complete search history.

(56) References Cited

U.S. PATENT DOCUMENTS

| | | | |
|---|---|---|---|
| 3,873,029 | A | 3/1975 | Amerace |
| 4,093,491 | A | 6/1978 | Whelpton |
| 4,355,222 | A | 10/1982 | Geithman et al. |
| 4,885,667 | A | 12/1989 | Selden |
| 5,807,473 | A | 1/1998 | Donnelly |
| 8,595,911 | B2 | 12/2013 | Hendren |
| 8,741,081 | B2 | 6/2014 | Schmitt |

(Continued)

FOREIGN PATENT DOCUMENTS

| | | |
|---|---|---|
| CN | 105786086 | 7/2016 |
| CN | 105786086 A * | 7/2016 |
| CN | 205485711 | 8/2016 |

*Primary Examiner* — Carson Gross
(74) *Attorney, Agent, or Firm* — Joseph M. Butscher; The Small Patent Law Group LLC

(57) ABSTRACT

A system and a method for securing a panel insert to a panel include a main housing, a heater within the main housing, a coupling rod extending from the main housing, and a clamp assembly coupled to the coupling rod. The clamp assembly is configured to clamp the panel insert to the panel. The heater is configured to cure an adhesive applied to the panel insert to bond the panel insert to the panel.

45 Claims, 9 Drawing Sheets

(56) References Cited

U.S. PATENT DOCUMENTS

| | | |
|---|---|---|
| 9,782,877 B2 | 10/2017 | Marquis |
| 10,385,905 B1 * | 8/2019 | Rice ...................... F16B 11/006 |
| 11,167,401 B2 | 11/2021 | Osborne |
| 11,229,089 B2 * | 1/2022 | Hutter, III .............. H05B 3/141 |
| 2011/0290774 A1 | 12/2011 | Denante |
| 2018/0147788 A1 | 5/2018 | Newfrey |
| 2021/0022097 A1 | 7/2021 | Osborne |

* cited by examiner

SYSTEMS AND METHODS FOR SECURING A PANEL INSERT TO A PANEL

FIELD OF THE DISCLOSURE

Examples of the present disclosure generally relate to tools, and more particularly to systems and methods for securing panel inserts to panels.

BACKGROUND OF THE DISCLOSURE

Panels are used in a variety of applications as structural elements. When fastening a panel to another element, holes may be drilled or otherwise formed through the panel for a fastener or the like. Depending on the type of material used for the panel, it may be undesirable to install the fastener directly in the holes of the panel. Thus, panel inserts may be installed in the holes of the panel. One type of panel insert is a one-sided panel insert that includes a bushing that is inserted in a hole of the panel, and a flange on one end of the bushing that engages one side of the panel. The other end of the bushing may be flush with the other side of the panel, may be recessed in the hole, may project from the hole, and/or the like. A one-sided panel insert also includes a thru-hole (threaded or non-threaded) for a fastener that is used to secure the panel to another element. A one-sided panel insert is typically bonded to the panel with an adhesive on the flange and/or bushing.

A known method for installing an insert into a panel includes installing an entire panel into and over the insert, or disposing a large heat blanket over the insert in order to cure the adhesive. However, such a method does not focus the heat onto the insert and adhesive. Further, such as method typically does not constrain the insert while the adhesive cures, which can lead to the insert backing out if not properly inserted into panel, or if a hole in the panel is even slightly out of tolerance.

SUMMARY OF THE DISCLOSURE

A need exists for an efficient and effective system and method for securing a panel insert to a panel.

With that need in mind, certain examples of the present disclosure provide a system for securing a panel insert to a panel. The system includes a main housing, a heater within the main housing, a coupling rod extending from the main housing, and a clamp assembly coupled to the coupling rod.

In at least one example, the clamp assembly is configured to clamp the panel insert to the panel. The heater is configured to cure an adhesive applied to the panel insert to bond the panel insert to the panel.

The heater can be configured to move within an internal chamber of the main housing. Optionally, the heater can be fixed within an internal chamber of the main housing.

In at least one example, the coupling rod has a shaft that extends through a passage of the heater.

The clamp assembly can threadably couple to an end of the coupling rod. The clamp assembly can be integrally coupled to the coupling rod.

In at least one example, adhesive is applied to an underside of a bushing of the panel insert. The panel insert is configured to be inserted into a hole of the panel. The main housing is configured to be disposed over the panel insert such that an end of the coupling rod passes through a thru-hole of the panel insert. The end of the coupling rod is configured to be removably coupled to the clamp assembly. The clamp assembly is configured to be tightened to clamp the panel insert to the panel.

In at least one example, the heater includes one or more heating elements around a passage. A portion of the coupling rod extends through the passage. The heater can also include a heat isolating component within the passage. The heating isolating component is disposed between the one or more heating elements and the portion of the coupling rod. The heating isolating component can include an insulating plastic sheath.

In at least one example, the clamp assembly includes a collar configured to be rotationally constrained in relation to the panel, and a knob rotatable relative to the collar. The knob couples to the coupling rod. Rotation of the knob causes the coupling rod to rotate.

In at least one example, the collar includes a first central passage. The knob includes a second central passage that is coaxial with the first central passage. A portion of the coupling rod passes through the first central passage and into the second central passage.

In at least one example, the collar includes a circumferential flange having a flat upper surface configured to abut against a surface of the panel. The collar can also include an interior funnel that leads from the flange into a central passage defined by an interior sleeve. In at least one example, a ball bearing couples the collar to the knob.

Certain examples of the present disclosure provide a method for securing a panel insert to a panel. The method includes providing a heater within a main housing; extending a coupling rod from the main housing; and coupling a clamp assembly to the coupling rod.

In at least one example, the method also includes clamping, by the clamp assembly, the panel insert to the panel; curing, by the heater, an adhesive applied to the panel insert; and bonding, through said curing, the panel insert to the panel.

In at least one example, the method also includes applying adhesive to an underside of a bushing of the panel insert; inserting the panel insert into a hole of the panel; disposing the main housing over the panel insert such that an end of the coupling rod passes through a thru-hole of the panel insert; and tightening the clamp assembly to clamp the panel insert to the panel.

Certain examples of the present disclosure provide a clamp assembly for a system for securing to a panel. The clamp assembly includes a collar configured to be rotationally constrained in relation to the panel, and a knob rotatable relative to the collar.

Certain examples of the present disclosure provide a method for securing a system to a panel. The method includes rotationally constraining a collar of a clamp assembly in relation to the panel, and rotating a knob of the clamp assembly relative to the collar.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a system for securing a panel insert to a panel. In at least one example, the system provides a bonding tool configured to bond a panel insert onto a panel. In at least one example, the system clamps and secures the panel insert to the panel, and applies a desired amount of heat for a predetermined amount of time in order to cure the adhesive to secure the panel insert to the panel. Examples of the present disclosure eliminate, minimize, or otherwise reduce uncontrolled heating cycles and temperatures of the adhesive, unnecessary heating of the entire panel, and uncontrolled clamping procedures of the insert to the panel.

In at least one example, the system includes a thermocouple and small resistive heaters to heat an aluminum block in a controlled fashion and hold it at a desired temperature for a desired amount of time while the adhesive (for example, an epoxy) cures.

In at least one example, the system also includes a clamp mechanism that holds the panel insert at proper force while the adhesive fully cures. For example, the clamp mechanism includes a hand-tightened knob for temporarily clamping and securing the insert and bonding tool to the floor panel. As a further example, the clamp mechanism does not scuff or otherwise damage the panel (in contrast to a spinning knob that rotates directly against a panel, and could therefore mar or scuff the panel). As such, the system eliminates, minimizes, or otherwise reduces potential waste of panels (which may otherwise be marred or scuffed).

Figure 1:
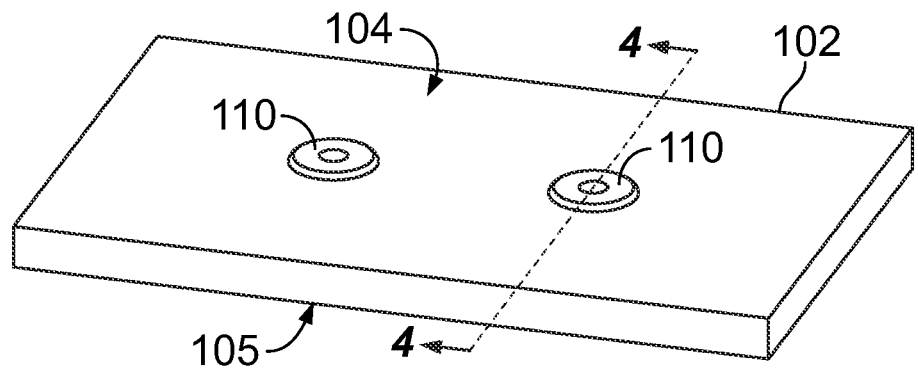
FIG. 1 illustrates an isometric top view of a panel.

FIG. 1 illustrates an isometric top view of a panel 102. The panel 102 is generally flat or planar, and may be made from metal materials, such as Titanium, Aluminum, etc., may be made from composite materials, such as a Carbon Fiber Reinforced Polymer (CFRP), Carbon Fiber Reinforced Plastic (CRP), Carbon Fiber Reinforced Thermoplastic (CFRTP), etc., or may be made from another type of material, such as fiberglass. The panel 102 may be used as a structural element for machines, such as aircraft, watercraft, automobiles, and the like.

Figure 2:
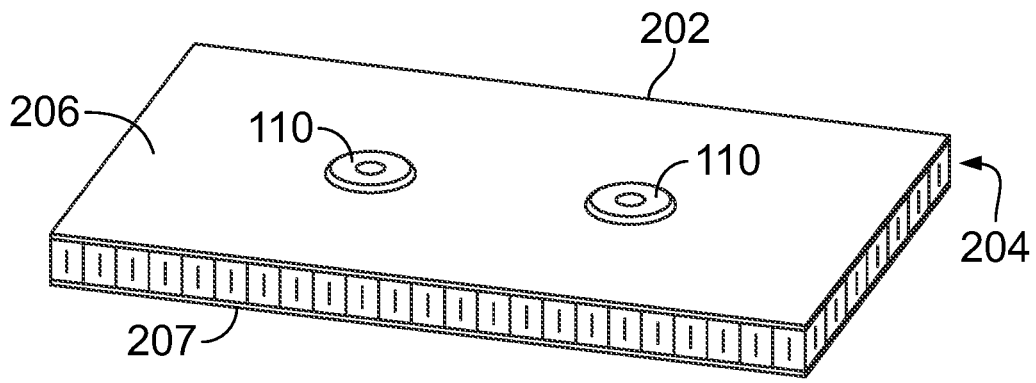
FIG. 2 illustrates an isometric top view of a honeycomb panel.

FIG. 2 illustrates an isometric top view of a honeycomb panel 202. The honeycomb panel 202 is an example of the panel 102, shown in FIG. 1. The honeycomb panel 202 includes a honeycomb core 204 sandwiched between face sheets 206 and 207. The honeycomb core 204 is a cellular structure including an array of empty or hollow cells (for example, hexagonal cells). The face sheets 206 and 207 are bonded to opposing sides of the honeycomb core 204. The face sheets 206 and 207 may be solid sheets of material or perforated sheets of material that are generally flat.

Referring again to FIG. 1, when the panel 102 is fastened to another element, holes may be drilled or otherwise formed through the panel 102 for a fastener or the like. To protect the panel 102, a panel insert 110 can be installed in the holes of the panel 102. The panel inserts 110 as described herein may be one-sided, as the panel inserts 110 are inserted into holes in the panel 102 from one side (for example, the top side 104) of the panel 102. The panel inserts 110 are typically bonded to the panel 102 to secure the panel inserts 110 in the holes.

Figure 3:
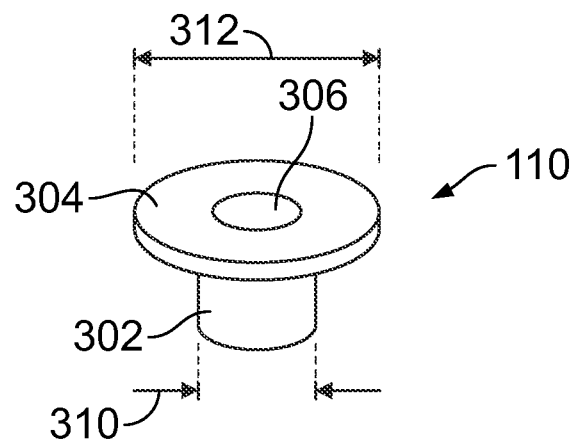
FIG. 3 illustrates an isometric top view of a panel insert.

FIG. 3 illustrates an isometric top view of the panel insert 110. The panel insert 110 includes a bushing 302 or shaft that is inserted in a hole of the panel 102, and a flange 304 on one end of the bushing 302. An outer diameter 310 of the bushing 302 is sized to fit within a hole in the panel 102. The outer surface of the bushing 302 may have surface features, such as ribs, splines, etc., or may be smooth. The flange 304 has an outer diameter 312 that is larger than the outer diameter 310 of the bushing 302 so that the flange 304 contacts the top side 104 of the panel 102 when the panel insert 110 is pressed or otherwise inserted in the panel 102. The panel insert 110 also includes a thru-hole 306 (threaded or non-threaded) for a fastener that is used to secure the panel 102 to another element. Figure shows the structure of a general panel insert 110. The panel insert 110 can be sized, shaped, and configured differently than shown.

Figure 4:
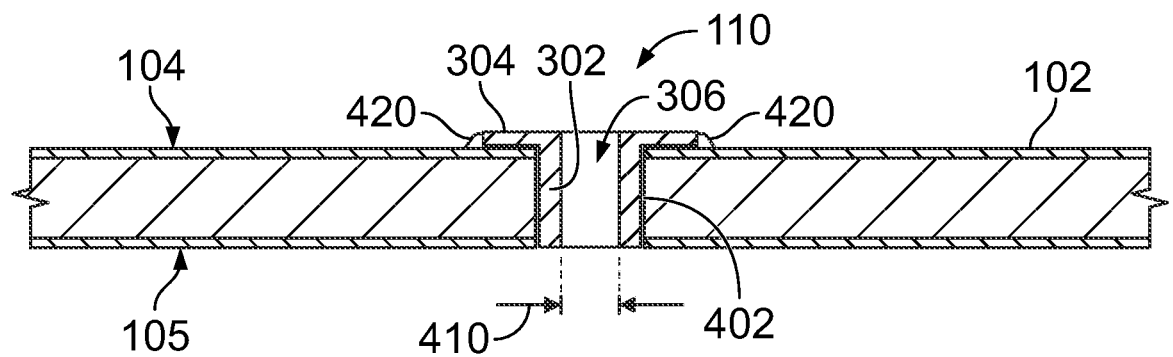
FIG. 4 illustrates a cross-sectional view of a panel insert installed in a panel through line 4-4 of FIG. 1.

FIG. 4 illustrates a cross-sectional view of the panel insert 110 installed in the panel 102 through line 4-4 of FIG. 1. The panel insert 110 is pressed or otherwise installed in a hole 402 of the panel 102 from the top side 104. When installed, the bushing 302 of the panel insert 110 fits within the hole 402, and the flange 304 contacts the top side 104 of the panel 102. The end of the bushing 302 opposite the flange 304 may be flush with a bottom side 105 of the panel 102 as is illustrated in FIG. 4. However, this end of the bushing 302 may be partially recessed into the hole 402 or may project from the hole 402 in other examples. The thru-hole 306 of the panel insert 110 has a diameter 410 that is sized to fit a fastener or the like. The flange 304 and/or the bushing 302 is bonded to panel 102 with an adhesive 420 or the like, so the panel insert 110 may be referred to as a bonded panel insert.

Figure 5:
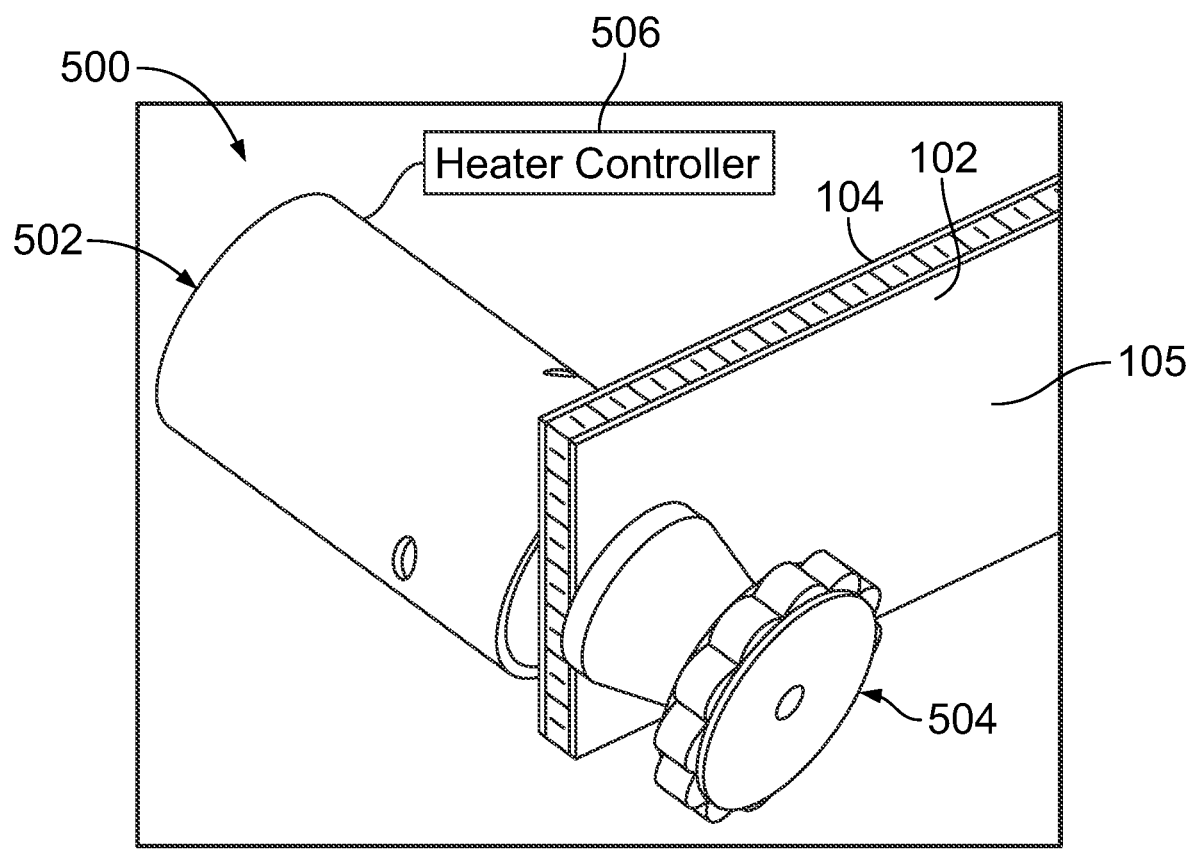
FIG. 5 illustrates a perspective view of a system for securing a panel insert to a panel, according to an example of the present disclosure.

FIG. 5 illustrates a perspective view of a system 500 for securing a panel insert 110 (shown in FIGS. 1-4) to a panel 102, according to an example of the present disclosure. The system 500 provides a bonding tool that is configured to securely bond the panel insert 110 to the panel 102.

The system 500 includes a main housing 502 coupled to a clamp assembly 504 through a coupling rod (not shown in FIG. 5). The main housing 502 retains a heater (not shown in FIG. 5) that is configured to apply heat to the panel insert 110 and adhesive to securely bond the panel insert 110 to the panel 102. A heater controller 506 is operatively connected to the heater, such as through one or more wired or wireless connections. The heater controller 506 is configured to control operation of the heater to provide a desired amount of heat for a desired amount of time to cure the adhesive so that the panel insert 110 securely bonds to the panel 102.

As shown, the heater controller 506 can be outside of the main bousing 502. In at least one other example, the heater controller 506 can be retained within the main housing 502.

In operation, the system 500 is configured to bond the panel insert 110 to the panel 102. The clamp assembly 504 clamps and secures the panel insert 102 to the panel 110, and the heater controller 506 operates the heater to provide a desired amount of heat for a desired amount of time in order to cure the adhesive, which securely bonds the panel insert 110 to the panel 102.

Figure 6:
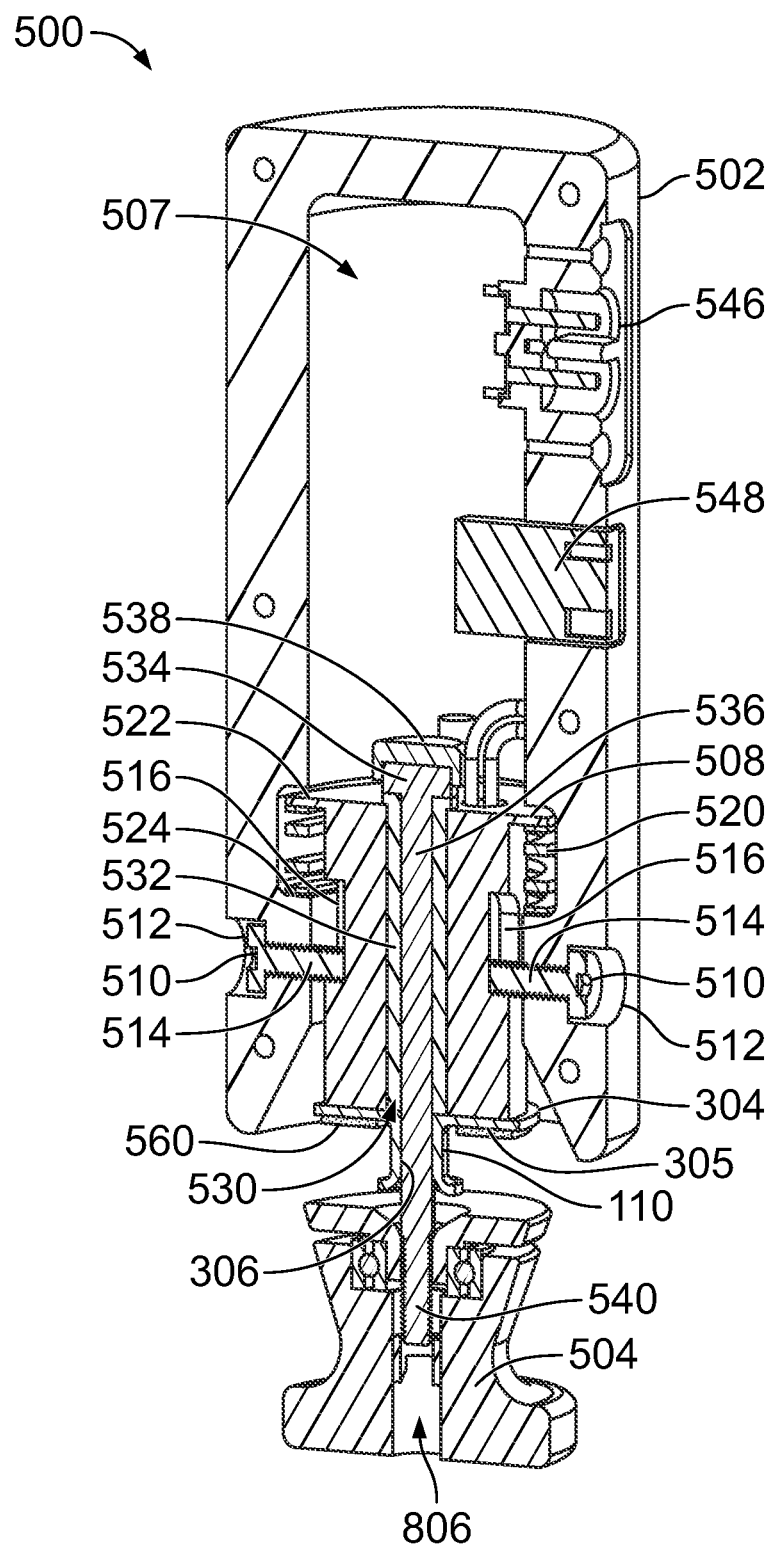
FIG. 6 illustrates a transverse cross-sectional, isometric view of the system for securing the panel insert to the panel, according to an example of the present disclosure.

FIG. 6 illustrates a transverse cross-sectional, isometric view of the system 500 for securing the panel insert 110 to the panel 102 (shown in FIGS. 1-5), according to an example of the present disclosure. The system 500 includes the main housing 502, which can be formed of a metal, such as Aluminum. The main housing 502 includes an internal chamber 507.

The heater 508 is disposed within the internal chamber 507. For example, the heater 508 is secured within the internal chamber 507 by one or more fasteners 510 (such as screws or bolts) that extend into the internal chamber 507 through respective through holes 512. Ends 514 of the fasteners 510 are retained within outer recesses 516 of the heater 508. The recesses 516 can include an extended length, which allows the heater 508 to axially slide up and down in relation to the fasteners 510. Optionally, the recesses 516 can be sized and shaped to axially constrain the heater 508 within the internal chamber 507.

In at least one example, a wave spring 520 can be compressed between an upper cap 522 of the heater 508, and a ledge 524 within the internal chamber 507. The wave spring 520 exerts a spring force into the heater 508, which resists axial motion of the heater 508 within the internal chamber 507. The heater 508 can be controlled to axially move against the wave spring 520, as desired. Optionally, the system 500 may not include the wave spring. Instead, a bracing sleeve can be disposed between the upper cap 522 and the ledge 524, thereby preventing or otherwise reducing axial motion of the heater 508 within the internal chamber 507. Also, optionally, the fasteners 510 can be secured to the heater 508 to prevent or otherwise reduce axial motion of the heater 508 within the internal chamber 507.

A passage 530 extends through the heater 508. For example, the passage 530 can be coaxial with the heater 508. The coupling rod 532 extends through the passage 530. The coupling rod 532 includes a head 534 and a shaft 536 extending from the head 534. The head 534 has a diameter larger than the passage 530. As such, the head 534 does not extend into the passage 530. The shaft 536 extends into the passage 530. A cap 538 can fit over the head 534. The cap 538 can be formed of a plastic, for example, and configured to shield the head 534 from heat generated by the heater 508.

An end 540 of the coupling rod 532 distally located from the head 534 removably secures to the clamp assembly 504, such as through a threaded interface. In operation, the panel insert 110 is clamped to the panel 102 (shown in FIGS. 1-5) between the clamp assembly 504 and the main housing 502, such as in relation to the heater 508.

The system 500 can also include one or more electrical receptacles 546 configured to electrically couple to heating elements of the heater 508. The system 500 can also include one or more thermocouple receptacles 548 configured to electrically couple to one or more thermocouples of the heater 508 and/or disposed between the heater 508 and the coupling rod 532.

Referring to FIGS. 1-6, the system 500 provides a bonding tool that is configured to secure (such as through bonding) the panel insert 110 to the panel 102. Adhesive 560 is applied to the panel insert 110. For example, the adhesive 560 is applied to an underside 305 of the bushing 302 of the panel insert 110. The panel insert 110 is then inserted into the hole 402 of the panel 102. Next, the main housing 502 is disposed over the panel insert 110 such that the end 540 of coupling rod 523 passes through the thru-hole 306 of the panel insert 110. The end 540 can be threaded and configured to threadably engage the clamp assembly 504. As such, the clamp assembly 504 is axially aligned with the end 540, and threadably secured thereto. As the clamp assembly 504 continues to be rotated in a securing (tightening) direction, the clamp assembly 504 draws the main housing 502, through engagement with the coupling rod 532, closer to the clamp assembly 504, and securely clamps the panel insert 110 to the panel 102. That is, by rotating the clamp assembly 504 in a tightening direction in relation to the coupling rod 532, clamping pressure is applied to the panel insert 110, thereby clamping the panel insert 110 to the panel 102. Further, during such tightening, the heater 508 is drawn closer to the bushing 302 of the panel insert 110 (and the adhesive 560).

When the panel insert 110 is clamped to the panel 102, as desired, the heater controller 506 is activated. The heater controller 506 is programmed to apply a desired amount of heat to the panel insert 110 for a desired amount of time based in order to cure the adhesive, which bonds the panel insert 110 to the panel 102. When the heating cycle is complete (such as after a predetermined period of time), the heater controller 506 is deactivated. Next, the clamp assembly 504 is removed from the coupling rod 532 (such as by rotating in an opposite direction from the tightening direction), and the main housing 502 is removed from the panel 110, thereby removing the coupling rod 532 from the panel insert 110.

As described herein, the system 500 for securing the panel insert 110 to the panel 102 includes the main housing 502, the heater 508 within the main housing 502, the coupling rod 532 extending from the main housing 502, and the clamp assembly 504 coupled to the coupling rod 532.

Figure 7:
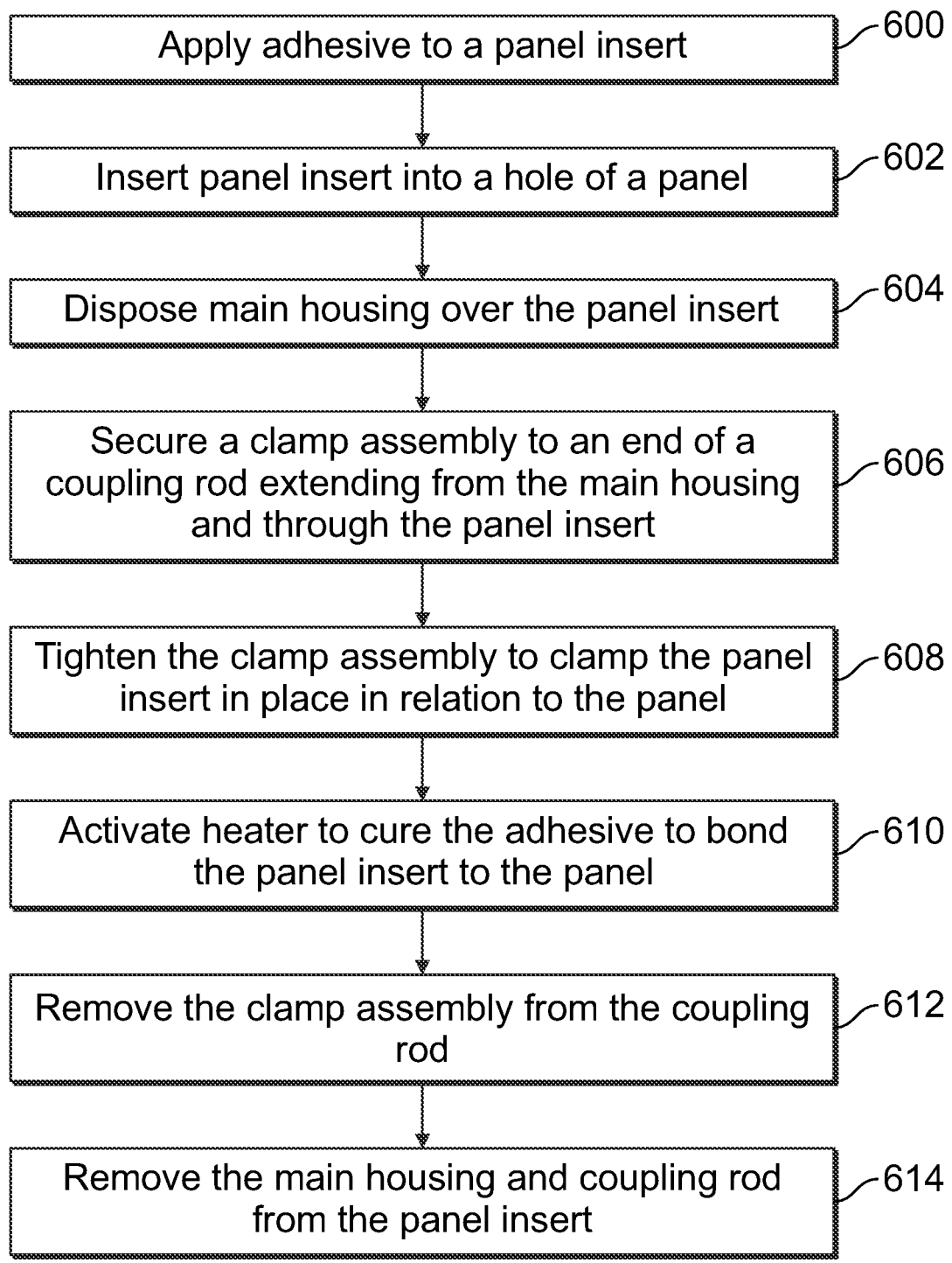
FIG. 7 illustrates a flow chart of a method of securing a panel insert to a panel, according to an example of the present disclosure.

FIG. 7 illustrates a flow chart of a method of securing a panel insert to a panel, according to an example of the present disclosure. Referring to FIGS. 1-7, at 600, the adhesive 560 is applied to the panel insert 110. At 602, the panel insert 110 is then inserted into the hole 402 of the panel 102. At 604, the main housing 502 of the system 500 is disposed over the panel insert 110 such that the end 540 of the coupling rod 532 extends through the thru-hole 306 of the panel insert 110. At 606, the clamp assembly 504 is secures to the end 540 of the coupling rod 532, which extends from the main housing 502 and through the panel insert 110. At 608, the clamp assembly 504 is tightened in relation to the coupling rod 532 to clamp the panel insert 110 in place in relation to the panel 102. At 610, the heater 508 is activated to cure the adhesive 560 to bond the panel insert 110 to the panel 102. After the curing and bonding, at 612, the clamp assembly 504 is removed from the coupling rod 532 (such as via rotating in a loosening direction). After the clamp assembly 504 is removed from the coupling rod 532, at 514, the main housing 502 and coupling rod 532 are removed from the panel insert 110.

As noted, the heater controller 506 controls the heat output of the heater 508. As used herein, the term "controller," "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the heater controller 506 may be or include one or more processors that are configured to control heating operation, as described herein.

The heater controller 506 is configured to execute a set of instructions that are stored in one or more data storage units or elements (such as one or more memories), in order to process data. For example, the heater controller 506 may include or be coupled to one or more memories. The data storage units may also store data or other information as desired or needed. The data storage units may be in the form of an information source or a physical memory element within a processing machine.

The set of instructions may include various commands that instruct the heater controller 506 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the heater controller 506. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the heater controller 506 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 8:
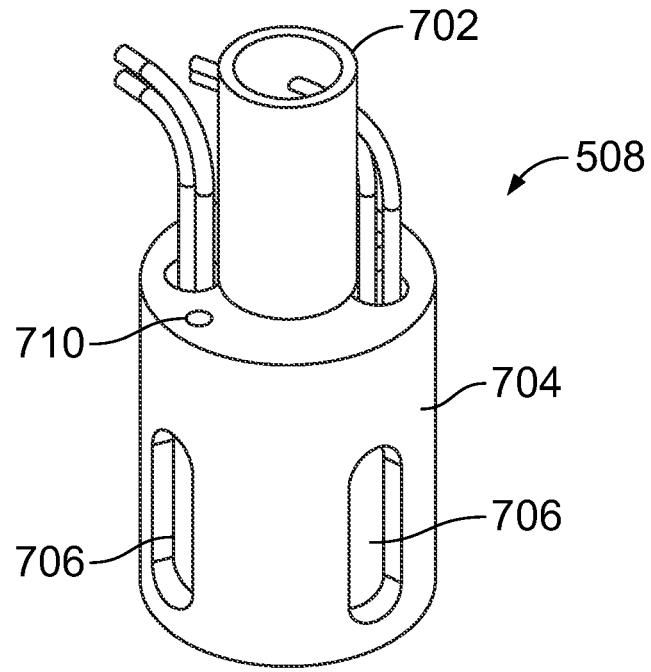
FIG. 8 illustrates an isometric top view of a heater, according to an example of the present disclosure.
Figure 9:
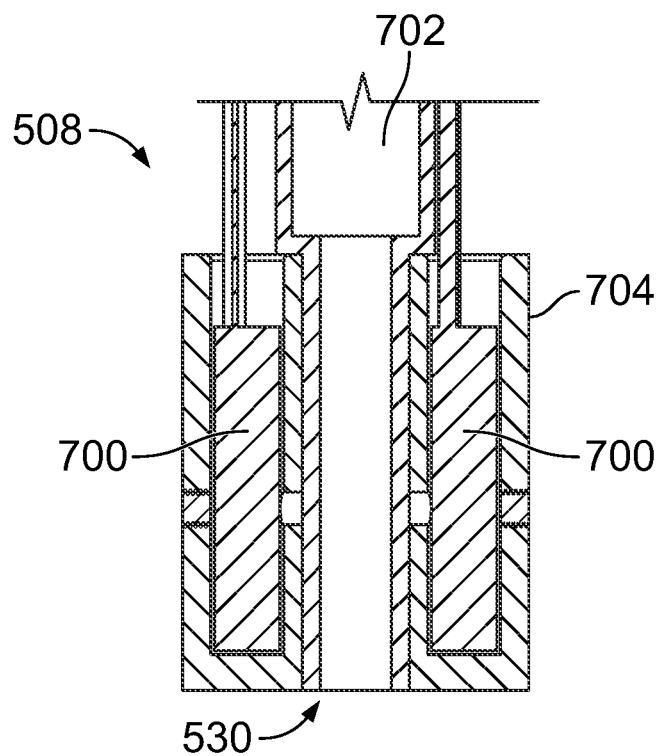
FIG. 9 illustrates a transverse cross-sectional view of the heater of FIG. 8.

FIG. 8 illustrates an isometric top view of the heater 508, according to an example of the present disclosure. FIG. 9 illustrates a transverse cross-sectional view of the heater 508 of FIG. 8. Referring to FIGS. 8 and 9, the heater 508 includes one or more heating elements 700 (such as heating coils) disposed around the passage 530. A heat isolating component 702, such as an insulating plastic sheath, is disposed within the passage 530, between the heating elements 700 and the shaft 536 of the coupling rod 532 (shown in FIG. 6).

The heater 508 can includes an outer body 704 that retains the heating elements 700. The outer body 704 can be formed of a metal, such as Aluminum. The outer body 704 can also include recessed areas 706, such as grooves. The recessed areas 706 are configured to receive and retain reciprocal structures (shown in FIG. 6), such as tabs, posts, nubs, fasteners, or the like, which secure the heater 508 within the main housing 502. The recessed areas 706 can be longer than engagement portions of the reciprocal structures, so as to allow the heater 508 to axially move within the main housing 502. The heater 508 can also include a thermocouple cavity 710, such as on an upper portion of the outer body 704.

The heat isolating component 702 provides a heat shield that surrounds the shaft 536 within the passage 530. The heat isolating component 702 is configured to reduce a temperature within the passage 530 when the heating elements 700 are active. As such, the heating isolating component 702 is configured to reduce heat applied to the shaft 536. Alternatively, the heater 508 may not include the heat isolating component 702.

Figure 10:
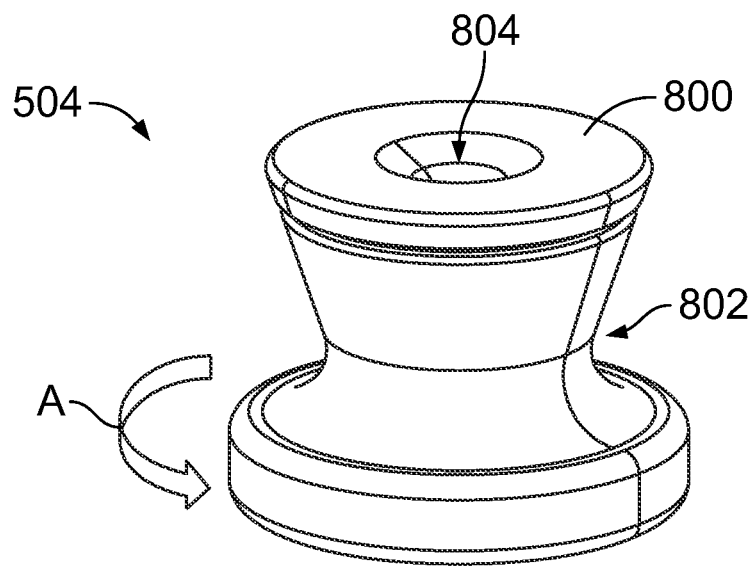
FIG. 10 illustrates an isometric view of a clamp assembly, according to an example of the present disclosure.

FIG. 10 illustrates an isometric view of the clamp assembly 504, according to an example of the present disclosure. In at least one example, the clamp assembly 504 includes a collar 800 and a knob 802 that is rotatable in relation to the collar 800. Referring to FIGS. 1-10, when the clamp assembly 504 is secured to the coupling rod 532 and the panel 102, the collar 800 is rotationally constrained in relation to the panel 102, while the knob 802 is rotated to selectively tighten or loosen the clamp assembly 504 in relation to the coupling rod 532, as described herein. In at least one example, rotation of the knob does not cause the collar 800 to rotate. That is, the collar 800 is fixed in relation to the panel 102, and does not rotate on a surface of the panel 102. In this manner, the clamp assembly 504 eliminates, minimizes, or otherwise reduces a potential of marring, scuffing, or otherwise affecting the surface of the panel 102. Alternatively, the clamp assembly 504 may not include the collar 800, but may be configured to rotate directly on a surface of the panel 102.

Figure 11:
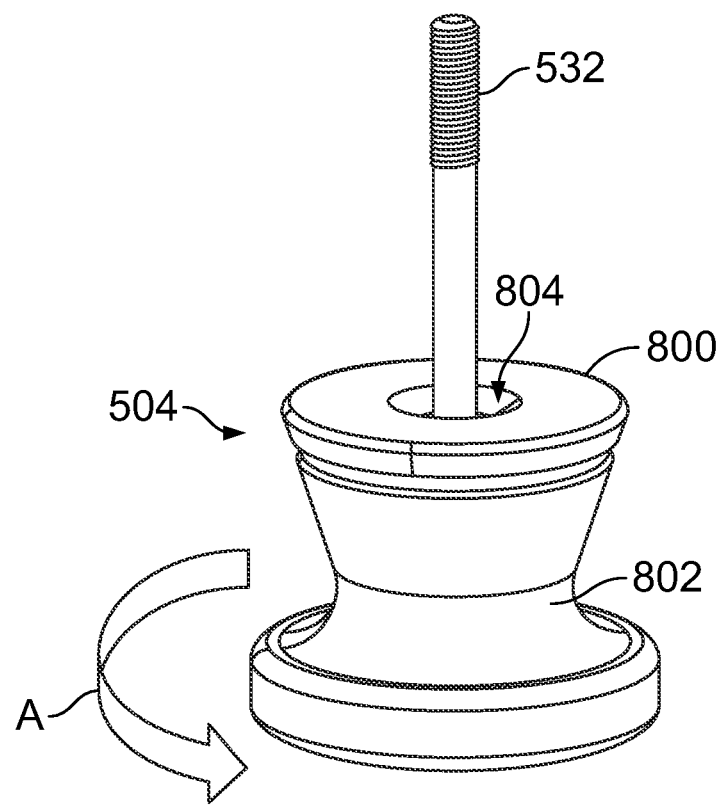
FIG. 11 illustrates an isometric view of the clamp assembly coupled to a coupling rod, according to an example of the present disclosure.

FIG. 11 illustrates an isometric view of the clamp assembly 504 coupled to the coupling rod 532, according to an example of the present disclosure. Referring to FIGS. 10 and 11, the collar 800 includes a central passage 804 into which the end 540 (shown in FIG. 6) of the coupling rod 532 passes. The end 540 extends into a coaxial central passage 806 of the knob 802, which can be threadably secured to the end 540. In at least one other example, the end 540 can be integrally coupled and fixed to the knob 802. Thus, rotation of the knob 802 in the direction of arc A, for example, causes a corresponding rotation of the coupling rod 532.

Figure 12:
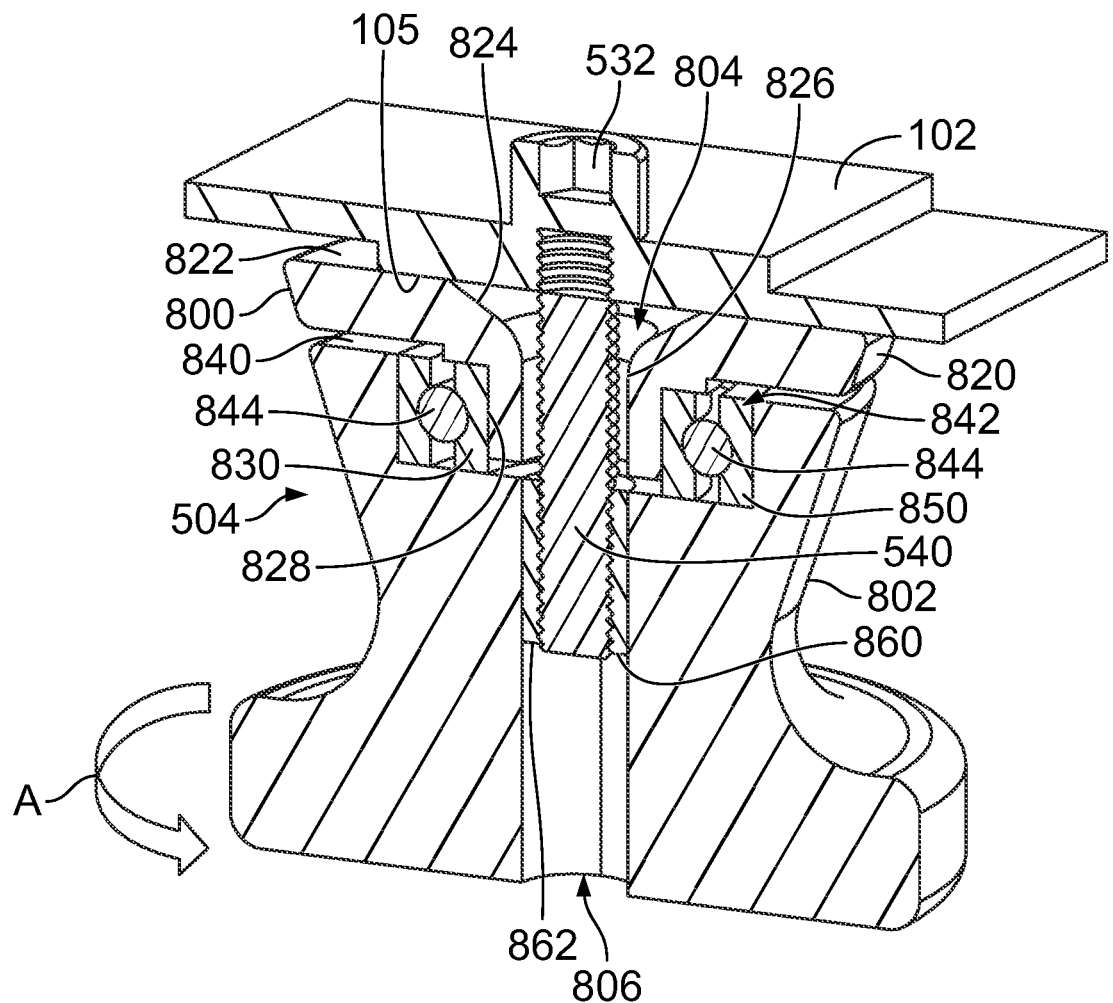
FIG. 12 illustrates a transverse cross-sectional view, isometric view of the clamp assembly coupled to the coupling rod and a panel, according to an example of the present disclosure.

FIG. 12 illustrates a transverse cross-sectional view, isometric view of the clamp assembly 504 coupled to the coupling rod 532 and the panel 102, according to an example of the present disclosure. The collar 800 includes a circumferential flange 820 having a flat upper surface 822 that abuts against a surface (for example, the bottom side 105) of the panel 102. An interior funnel 824 leads from the flange 820 into the central passage 804, which is defined by an interior sleeve 826.

An outer surface 828 of the interior sleeve 826 is secured to a fixed portion 830 of a ball bearing 842, which includes a plurality of balls 844 retained between the fixed portion 830 and a rotatable portion 850 secured to the knob 802. In this manner, the ball bearing 842 allows the knob 802 to rotate relative to the collar 800, which is rotationally constrained (that is, does not rotate) relative to the panel 102. Optionally, the clamp assembly 504 may not include the ball bearing 842, but can be rotationally secured to the collar 800, such as through a threadable interface, a sliding interface, and/or the like.

As shown, the knob 802 may include internal threads 860 that threadably engage exterior threads 862 of the end 540 of the coupling rod 532. As such, the knob 802 can be removably coupled to the coupling rod 532 through a threadable interface.

Figure 13:
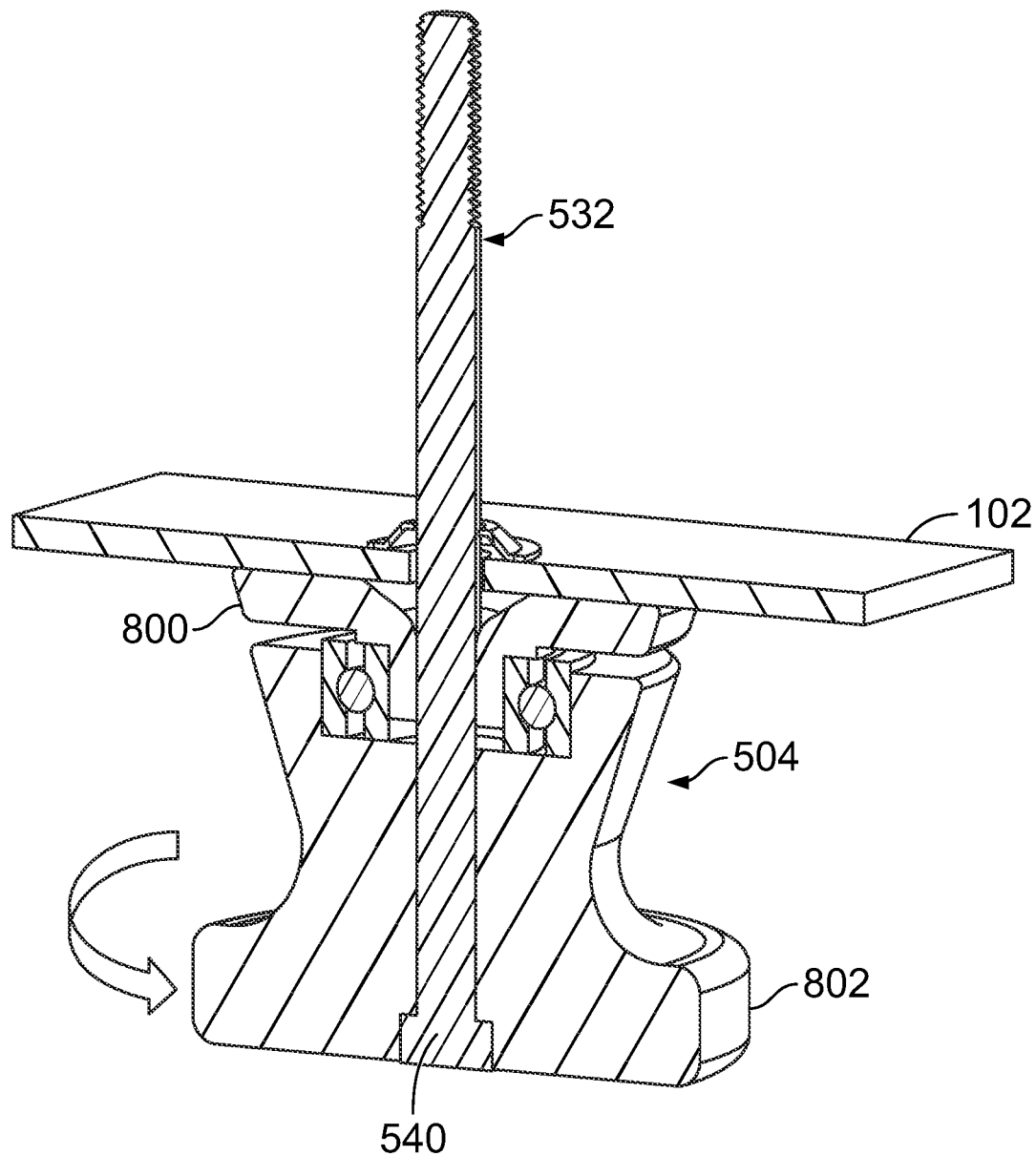
FIG. 13 illustrates a transverse cross-sectional view, isometric view of the clamp assembly coupled to the coupling rod and a panel, according to an example of the present disclosure.

FIG. 13 illustrates a transverse cross-sectional view, isometric view of the clamp assembly 504 coupled to the coupling rod 532 and the panel 102, according to an example of the present disclosure. In this example, the coupling rod 532 can be integrally coupled to the knob 802, instead of being threadably secured thereto. For example, the end 540 of the coupling rod 532 can be permanently secured to the knob 802, and the opposite end of the coupling rod 532 can be configured to be removably from the main housing 502 (shown in FIGS. 5 and 6).

Referring to FIGS. 10-13, the clamp assembly 504 provides a hand-tightened knob 802 that is rotatable relative to the fixed collar 800, which is rotationally constrained in relation to the panel 102. Because the fixed collar 800 abuts the panel 102 (and not the rotatable knob), the clamp assembly 504 is less susceptible to marring, scuffing, or otherwise affecting the surface of the panel 102. The clamp assembly 504 as shown in FIGS. 10-13 can be used with respect to any type of structure which couples to a rotatable knob. That is, the clamp assembly 504 can be used with various other systems, assemblies, devices, and the like other than the main housing 502 shown in FIGS. 5 and 6.

Figure 14:
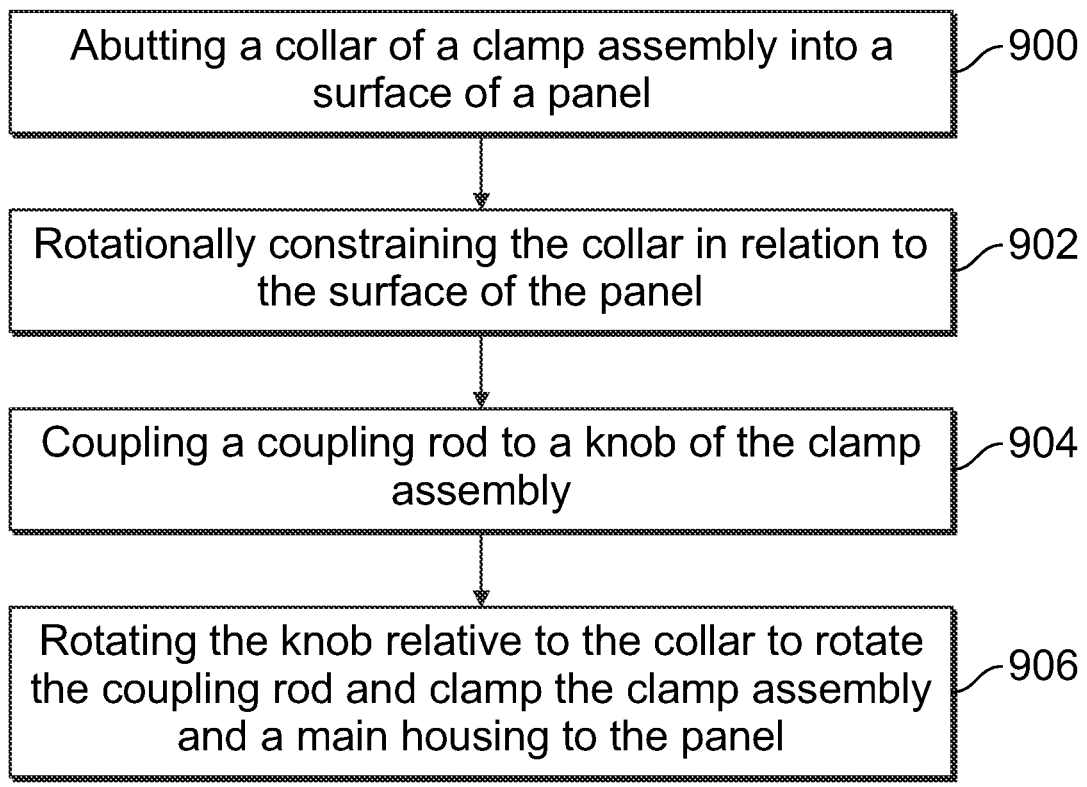
FIG. 14 illustrates a flow chart of a method for securing a system to a panel, according to an example of the present disclosure.

FIG. 14 illustrates a flow chart of a method for securing a system to a panel, according to an example of the present disclosure. Referring to FIGS. 1-14, at 900, the collar 800 abuts into a surface (such as the bottom side 105) of the panel 102. At 902, the collar 800 is rotationally constrained in relation to the surface of the panel 102. That is, the collar 800 does not rotate in relation to the surface of the panel 102. At 904, the coupling rod 532 couples to the knob 802 of the clamp assembly 504. Step 904 can occur prior to 900 and/or 902. The coupling rod 532 can be removably secured to the knob 802, such as through a threadable interface, or may be integrally fixed to the knob 802. At 906, the knob 802 is rotated relative to the collar 800 to rotate the coupling rod 532 and thereby clamp the clamp assembly 504 and the main housing 502 to the panel 102.

Further, the disclosure comprises examples according to the following clauses:

Clause 1. A system for securing a panel insert to a panel, the system comprising:
  a main housing;
  a heater within the main housing;
  a coupling rod extending from the main housing; and
  a clamp assembly coupled to the coupling rod.

Clause 2. The system of Clause 1, wherein the clamp assembly is configured to clamp the panel insert to the panel, and wherein the heater is configured to cure an adhesive applied to the panel insert to bond the panel insert to the panel.

Clause 3. The system of Clauses 1 or 2, wherein the heater is configured to move within an internal chamber of the main housing.

Clause 4. The system of Clauses 1 or 2, wherein the heater is fixed within an internal chamber of the main housing.

Clause 5. The system of any of Clauses 1-4, wherein the coupling rod has a shaft that extends through a passage of the heater.

Clause 6. The system of any of Clauses 1-5, wherein the clamp assembly threadably couples to an end of the coupling rod.

Clause 7. The system of any of Clauses 1-5, wherein the clamp assembly is integrally coupled to the coupling rod.

Clause 8. The system of any of Clauses 1-7, wherein adhesive is applied to an underside of a bushing of the panel insert, wherein the panel insert is configured to be inserted into a hole of the panel, wherein the main housing is configured to be disposed over the panel insert such that an end of the coupling rod passes through a thru-hole of the panel insert, wherein the end of the coupling rod is configured to be removably coupled to the clamp assembly, and wherein the clamp assembly is configured to be tightened to clamp the panel insert to the panel.

Clause 9. The system of any of Clauses 1-8, wherein the heater comprises one or more heating elements around a passage, wherein a portion of the coupling rod extends through the passage.

Clause 10. The system of Clause 9, wherein the heater further comprises a heat isolating component within the passage, wherein the heating isolating component is disposed between the one or more heating elements and the portion of the coupling rod.

Clause 11. The system of Clause 10, wherein the heating isolating component comprises an insulating plastic sheath.

Clause 12. The system of any of Clauses 1-11, wherein the clamp assembly comprises:
  a collar configured to be rotationally constrained in relation to the panel; and
  a knob rotatable relative to the collar, wherein the knob couples to the coupling rod, and wherein rotation of the knob causes the coupling rod to rotate.

Clause 13. The system of Clause 12, wherein the collar comprises a first central passage, wherein the knob comprises a second central passage that is coaxial with the first central passage, and wherein a portion of the coupling rod passes through the first central passage and into the second central passage.

Clause 14. The system of Clauses 12 or 13, wherein the collar comprises a circumferential flange having a flat upper surface configured to abut against a surface of the panel.

Clause 15. The system of Clause 14, wherein the collar further comprises an interior funnel that leads from the flange into a central passage defined by an interior sleeve.

Clause 16. The system of any of Clauses 12-15, further comprising a ball bearing that couples the collar to the knob.

Clause 17. A method for securing a panel insert to a panel, the method comprising:
providing a heater within a main housing;
extending a coupling rod from the main housing; and
coupling a clamp assembly to the coupling rod.

Clause 18. The method of Clause 17, further comprising:
clamping, by the clamp assembly, the panel insert to the panel;
curing, by the heater, an adhesive applied to the panel insert; and
bonding, through said curing, the panel insert to the panel.

Clause 19. The method of Clauses 17 or 18, further comprising moving the heater within an internal chamber of the main housing.

Clause 20. The method of Clauses 17 or 18, further comprising fixing the heater within an internal chamber of the main housing.

Clause 21. The method of any of Clauses 17-20, further comprising extending a shaft of the coupling rod through a passage of the heater.

Clause 22. The method of any of Clauses 17-21, wherein said coupling comprises threadably coupling the clamp assembly to an end of the coupling rod.

Clause 23. The method of any of Clauses 17-21, wherein said coupling comprises integrally coupling the clamp assembly to the coupling rod.

Clause 24. The method of any of Clauses 17-23, further comprising:
applying adhesive to an underside of a bushing of the panel insert;
inserting the panel insert into a hole of the panel;
disposing the main housing over the panel insert such that an end of the coupling rod passes through a thru-hole of the panel insert; and
tightening the clamp assembly to clamp the panel insert to the panel.

Clause 25. The method of any of Clauses 17-25, further comprising extending a portion of the coupling rod through the passage of the heater.

Clause 26. The method of Clause 25, further comprising disposing a heating isolating component between one or more heating elements and the portion of the coupling rod.

Clause 27. The method of any of Clauses 17-26, further comprising:
rotationally constraining a collar of the clamp assembly in relation to the panel;
rotating a knob of the clamp assembly relative to the collar, wherein the knob couples to the coupling rod; and
rotating the coupling rod by said rotating the knob.

Clause 28. The method of Clause 27, wherein the collar comprises a first central passage, wherein the knob comprises a second central passage that is coaxial with the first central passage, and wherein a portion of the coupling rod passes through the first central passage and into the second central passage.

Clause 29. The method of Clauses 27 or 28, further comprising abutting a circumferential flange of the collar against a surface of the panel.

Clause 30. The method of any of Clauses 27-29, further comprising coupling the collar to the knob with a ball bearing.

Clause 31. A clamp assembly for a system for securing to a panel, the clamp assembly comprising:
a collar configured to be rotationally constrained in relation to the panel; and
a knob rotatable relative to the collar.

Clause 32. The clamp assembly of Clause 31, wherein the knob is configured to couple to a coupling rod, and wherein rotation of the knob causes the coupling rod to rotate.

Clause 33. The clamp assembly of Clause 32, wherein the collar comprises a first central passage, wherein the knob comprises a second central passage that is coaxial with the first central passage, and wherein a portion of the coupling rod passes through the first central passage and into the second central passage.

Clause 34. The clamp assembly of any of Clauses 31-33, wherein the collar comprises a circumferential flange having a flat upper surface configured to abut against a surface of the panel.

Clause 35. The clamp assembly of Clause 34, wherein the collar further comprises an interior funnel that leads from the flange into a central passage defined by an interior sleeve.

Clause 36. The clamp assembly of any of Clauses 31-35, further comprising a ball bearing that couples the collar to the knob.

Clause 37. A method for securing a system to a panel, the method comprising:
rotationally constraining a collar of a clamp assembly in relation to the panel; and
rotating a knob of the clamp assembly relative to the collar.

Clause 38. The method of Clause 37, further comprising coupling the knob to a coupling rod, and wherein said rotating causes the knob to rotate.

Clause 39. The method of Clauses 37 or 38, wherein the collar comprises a first central passage, wherein the knob comprises a second central passage that is coaxial with the first central passage, and wherein a portion of the coupling rod passes through the first central passage and into the second central passage.

Clause 40. The method of any of Clauses 37-39, wherein said rotationally constraining comprises abutting a circumferential flange having a flat upper surface configured against a surface of the panel.

Clause 41. The method of any of Clauses 37-40, further comprising coupling the collar to the knob with a ball bearing.

Clause 42. A system for securing a panel insert to a panel, the system comprising:
a main housing;
a heater within the main housing, wherein the heater is configured to cure an adhesive applied to the panel insert to bond the panel insert to the panel, wherein the heater comprises one or more heating elements around a passage;
a coupling rod extending from the main housing, wherein the coupling rod has a shaft that extends through a passage of the heater, and wherein at least a portion of the shaft extends through the passage; and
a clamp assembly coupled to the coupling rod, wherein the clamp assembly is configured to clamp the panel insert to the panel, wherein the clamp assembly comprises:
a collar configured to be rotationally constrained in relation to the panel; and a knob rotatable relative to the collar, wherein the knob couples to the coupling rod, and wherein rotation of the knob causes the coupling rod to rotate.

Clause 43. The system of Clause 42, wherein adhesive is applied to an underside of a bushing of the panel insert, wherein the panel insert is configured to be inserted into a hole of the panel, wherein the main housing is configured to be disposed over the panel insert such that an end of the coupling rod passes through a thru-hole of the panel insert, wherein the end of the coupling rod is configured to be removably coupled to the clamp assembly, and wherein the clamp assembly is configured to be tightened to clamp the panel insert to the panel.

Clause 44. The system of Clauses 42 or 43, wherein the heater further comprises a heat isolating component within the passage, wherein the heating isolating component is disposed between the one or more heating elements and the portion of the coupling rod.

Clause 45. The system of any of Clauses 42-44, wherein the collar comprises a first central passage, wherein the knob comprises a second central passage that is coaxial with the first central passage, and wherein a portion of the coupling rod passes through the first central passage and into the second central passage.

Clause 46. The system of any of Clauses 42-45, wherein the collar comprises a circumferential flange having a flat upper surface configured to abut against a surface of the panel.

Clause 47. The system of Clause 46, wherein the collar further comprises an interior funnel that leads from the flange into a central passage defined by an interior sleeve.

Clause 48. The system of any of Clauses 42-47, further comprising a ball bearing that couples the collar to the knob.

As described herein, examples of the present disclosure efficient and effective systems and methods for securing an insert to a panel.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for securing a panel insert to a panel, the system comprising:
   a main housing;
   a heater within the main housing;
   a coupling rod extending from the main housing; and
   a clamp assembly coupled to the coupling rod, wherein the clamp assembly comprises:
      a collar configured to be rotationally constrained in relation to the panel; and
      a knob rotatable relative to the collar, wherein the knob couples to the coupling rod, and wherein rotation of the knob causes the coupling rod to rotate.

2. The system of claim 1, wherein the clamp assembly is configured to clamp the panel insert to the panel, and wherein the heater is configured to cure an adhesive applied to the panel insert to bond the panel insert to the panel.

3. The system of claim 1, wherein the heater is configured to move within an internal chamber of the main housing.

4. The system of claim 1, wherein the heater is fixed within an internal chamber of the main housing.

5. The system of claim 1, wherein the coupling rod has a shaft that extends through a passage of the heater.

6. The system of claim 1, wherein the clamp assembly threadably couples to an end of the coupling rod.

7. The system of claim 1, wherein the clamp assembly is integrally coupled to the coupling rod.

8. The system of claim 1, wherein adhesive is applied to an underside of a bushing of the panel insert, wherein the panel insert is configured to be inserted into a hole of the panel, wherein the main housing is configured to be disposed over the panel insert such that an end of the coupling rod passes through a thru-hole of the panel insert, wherein the end of the coupling rod is configured to be removably coupled to the clamp assembly, and wherein the clamp assembly is configured to be tightened to clamp the panel insert to the panel.

9. The system of claim 1, wherein the heater comprises one or more heating elements around a passage, wherein a portion of the coupling rod extends through the passage.

10. The system of claim 9, wherein the heater further comprises a heat isolating component within the passage, wherein the heating isolating component is disposed between the one or more heating elements and the portion of the coupling rod.

11. The system of claim 10, wherein the heating isolating component comprises an insulating plastic sheath.

12. The system of claim 1, wherein the collar comprises a first central passage, wherein the knob comprises a second central passage that is coaxial with the first central passage, and wherein a portion of the coupling rod passes through the first central passage and into the second central passage.

13. The system of claim 1, wherein the collar comprises a circumferential flange having a flat upper surface configured to abut against a surface of the panel.

14. The system of claim 13, wherein the collar further comprises an interior funnel that leads from the flange into a central passage defined by an interior sleeve.

15. The system of claim 1, further comprising a ball bearing that couples the collar to the knob.

16. A method for a system for securing a panel insert to a panel, the system comprising:
   a main housing;
   a heater within the main housing;
   a coupling rod extending from the main housing; and
   a clamp assembly coupled to the coupling rod, wherein the clamp assembly comprises:
      a collar configured to be rotationally constrained in relation to the panel; and
      a knob rotatable relative to the collar, wherein the knob couples to the coupling rod, and wherein rotation of the knob causes the coupling rod to rotate,
   the method comprising:
   providing the heater within the main housing;
   extending the coupling rod from the main housing; and
   coupling the clamp assembly to the coupling rod.

17. The method of claim 16, further comprising:
   clamping, by the clamp assembly, the panel insert to the panel;
   curing, by the heater, an adhesive applied to the panel insert; and
   bonding, through said curing, the panel insert to the panel.

18. The method of claim 16, further comprising moving the heater within an internal chamber of the main housing.

19. The method of claim 16, further comprising fixing the heater within an internal chamber of the main housing.

20. The method of claim 16, further comprising extending a shaft of the coupling rod through a passage of the heater.

21. The method of claim 16, wherein said coupling comprises threadably coupling the clamp assembly to an end of the coupling rod.

22. The method of claim 16, wherein said coupling comprises integrally coupling the clamp assembly to the coupling rod.

23. The method of claim 16, further comprising:
   applying adhesive to an underside of a bushing of the panel insert;
   inserting the panel insert into a hole of the panel;
   disposing the main housing over the panel insert such that an end of the coupling rod passes through a thru-hole of the panel insert; and
   tightening the clamp assembly to clamp the panel insert to the panel.

24. The method of claim 16, further comprising extending a portion of the coupling rod through the passage of the heater.

25. The method of claim 24, further comprising disposing a heating isolating component between one or more heating elements and the portion of the coupling rod.

26. The method of claim 16, further comprising:
   rotationally constraining the collar of the clamp assembly in relation to the panel;
   rotating the knob of the clamp assembly relative to the collar; and
   rotating the coupling rod by said rotating the knob.

27. The method of claim 26, wherein the collar comprises a first central passage, wherein the knob comprises a second central passage that is coaxial with the first central passage, and wherein a portion of the coupling rod passes through the first central passage and into the second central passage.

28. The method of claim 26, further comprising abutting a circumferential flange of the collar against a surface of the panel.

29. The method of claim 26, further comprising coupling the collar to the knob with a ball bearing.

30. A system for securing a panel insert to a panel, the system comprising:
   a coupling rod extending from a main housing; and
   a clamp assembly comprising:
      a collar configured to be rotationally constrained in relation to the panel; and
      a knob rotatable relative to the collar, wherein the knob couples to the coupling rod, and wherein rotation of the knob causes the coupling rod to rotate.

31. The system of claim 30, wherein the collar further comprises a first central passage, wherein the knob comprises a second central passage that is coaxial with the first central passage, and wherein a portion of the coupling rod passes through the first central passage and into the second central passage.

32. The system of claim 30, wherein the collar comprises a circumferential flange having a flat upper surface configured to abut against a surface of the panel.

33. The system of claim 32, wherein the collar further comprises an interior funnel that leads from the flange into a central passage defined by an interior sleeve.

34. The system of claim 30, further comprising a ball bearing that couples the collar to the knob.

35. A method for a system for securing a panel insert to a panel, the system comprising:
   a coupling rod extending from a main housing; and
   a clamp assembly comprising:
      a collar configured to be rotationally constrained in relation to a panel; and
      a knob rotatable relative to the collar, wherein the knob couples to the coupling rod, and wherein rotation of the knob causes the coupling rod to rotate,
   the method comprising:
   rotationally constraining the collar of the clamp assembly in relation to the panel; and
   rotating the knob of the clamp assembly relative to the collar.

36. The method of claim 35, wherein the collar comprises a first central passage, wherein the knob comprises a second central passage that is coaxial with the first central passage, and wherein a portion of the coupling rod passes through the first central passage and into the second central passage.

37. The method of claim 35, wherein said rotationally constraining comprises abutting a circumferential flange having a flat upper surface configured against a surface of the panel.

38. The method of claim 37, further comprising coupling the collar to the knob with a ball bearing.

39. A system for securing a panel insert to a panel, the system comprising:
   a main housing;

a heater within the main housing, wherein the heater is configured to cure an adhesive applied to the panel insert to bond the panel insert to the panel, wherein the heater comprises one or more heating elements around a passage;

a coupling rod extending from the main housing, wherein the coupling rod has a shaft that extends through a passage of the heater, and wherein at least a portion of the shaft extends through the passage; and a clamp assembly coupled to the coupling rod, wherein the clamp assembly is configured to clamp the panel insert to the panel, wherein the clamp assembly comprises:

a collar configured to be rotationally constrained in relation to the panel; and a knob rotatable relative to the collar, wherein the knob couples to the coupling rod, and wherein rotation of the knob causes the coupling rod to rotate.

40. The system of claim 39, wherein adhesive is applied to an underside of a bushing of the panel insert, wherein the panel insert is configured to be inserted into a hole of the panel, wherein the main housing is configured to be disposed over the panel insert such that an end of the coupling rod passes through a thru-hole of the panel insert, wherein the end of the coupling rod is configured to be removably coupled to the clamp assembly, and wherein the clamp assembly is configured to be tightened to clamp the panel insert to the panel.

41. The system of claim 39, wherein the heater further comprises a heat isolating component within the passage, wherein the heating isolating component is disposed between the one or more heating elements and the portion of the coupling rod.

42. The system of claim 39, wherein the collar comprises a first central passage, wherein the knob comprises a second central passage that is coaxial with the first central passage, and wherein a portion of the coupling rod passes through the first central passage and into the second central passage.

43. The system of claim 39, wherein the collar comprises a circumferential flange having a flat upper surface configured to abut against a surface of the panel.

44. The system of claim 43, wherein the collar further comprises an interior funnel that leads from the flange into a central passage defined by an interior sleeve.

45. The system of claim 39, further comprising a ball bearing that couples the collar to the knob.

\* \* \* \* \*